United States Patent [19]
Gabella

[11] 3,718,356
[45] Feb. 27, 1973

[54] BUMPER AND BRAKE ACTUATOR ASSEMBLY

[76] Inventor: Aristides A. Gabella, 103 Evergreen Drive, La Porte, Ind. 46350

[22] Filed: Oct. 6, 1971

[21] Appl. No.: 186,866

[52] U.S. Cl...................293/5, 180/91, 188/106 R, 293/85, 293/89
[51] Int. Cl.........B60r 19/02, B60t 7/12, B61f 19/04
[58] Field of Search......180/91; 188/106 R; 293/1, 5, 293/6, 60, 70, 71, 85, 86, 89

[56] References Cited

UNITED STATES PATENTS

| | | | |
|---|---|---|---|
| 1,256,497 | 2/1918 | Sadlo | 293/5 X |
| 1,843,902 | 2/1932 | Ridge | 293/86 |
| 2,144,357 | 1/1939 | Booharin | 293/86 |
| 2,873,994 | 2/1959 | Omps | 293/86 |
| 2,966,225 | 12/1960 | Carroll | 293/86 X |

*Primary Examiner*—Drayton E. Hoffman
*Assistant Examiner*—Howard Beltran
*Attorney*—Carlton Hill et al.

[57] ABSTRACT

An impact absorbing bumper assembly in which a bumper is combined with a cylinder which is arranged to be secured to the chassis of a vehicle, the cylinder having a piston arranged to reciprocate therein. One shaft is secured to one end of the cylinder and a second shaft is secured to the piston. A pair of tubular members is provided, each having right angle bends therein. One of the tubular members receives the free end of the one shaft and the other of the tubular members receives the free end of the other shaft. A plurality of discrete balls is positioned in each of the tubular members between the rods and the free ends of the shaft to transmit impact forces from the bumper to the shafts. The piston arrangement is such that it includes a variable orifice means to reduce the amount of fluid passing through the piston as the displacement of the piston within the cylinder increases. The bumper assembly may be combined with the braking system of the vehicle to apply pressurized fluid thereto and thereby apply the brakes upon impact.

8 Claims, 8 Drawing Figures

3,718,356

BUMPER AND BRAKE ACTUATOR ASSEMBLY

BACKGROUND OF THE INVENTION

1. Field of the Invention

This invention is in the field of impact absorbing bumpers using a combined mechanical and hydraulic system for absorbing the impact, the mechanical system being used to transmit the impact forces and change their direction, and the hydraulic system being used to cushion the effect of the impact.

2. Description of the Prior Art

There has been a substantial amount of development work done in the field of impact absorbing bumpers in recent years primarily for the purpose of reducing the possibility and severity of injuries from collisions, and secondarily to reduce the amount of damage to the automobile body upon less severe impacts, and thereby reduce insurance rates.

Impact absorbing bumper assemblies have taken a wide variety of forms in recent years. Some have been provided which include a flexible outer shell that deforms upon impact, the shell being connected to a shaft which is received in a resiliently deformable bushing. Upon application of impact forces to the shell, the bushing is deformed to dissipate the effect of the impact.

Still other impact resistant bumpers have been designed utilizing synthetic resin foam as the impact absorbing member, the foam being covered with a thin elastomeric surface coating. In a modification of this type of device, the foam may be impregnated with a liquid which is vented to an expansible chamber when the foam is deformed by impact forces.

There are, of course, numerous impact absorbing bumper assemblies utilizing leaf springs and other type of spring means to cushion against the impact forces involved under collision. In the main, however, these impact absorbing bumpers have not met with commercial success for many reasons, among them being that they detract from the styling which the buying public has been accustomed to and they also add a considerable expense to the price of the automobile.

SUMMARY OF THE INVENTION

The invention is directed to an impact absorbing bumper including spaced rods or actuator along the length of the bumper which cooperate with a series of rotatable balls confined within a pair of right angular tubes. Upon impact, the bumper transmits the impact forces to the balls which in turn change the direction of the forces by 90° and apply the somewhat diminished resulting forces into a hydraulic system consisting of a piston reciprocable within an axially movable cylinder. The piston, in the preferred form of the invention, carries a rotatable disk coaxially therewith, both the piston and the disk having apertures therein for passing the hydraulic fluid contained in the cylinder. At the initiation of movement of the piston, the apertures in the disk and the piston are substantially aligned so that a maximum amount of fluid passes through the piston assembly and the resistance to piston travel is relatively low. As the piston continues in its movement through the cylinder, however, the disk rotates relative to the piston so that the effective orifices are decreased in area, thereby providing a greater resistance to flow of fluid through the piston. The piston and disk assembly thereby provide a variable orifice means which provides an increased resistance to flow of fluid as the piston continues toward the end of its travel within the cylinder. Spring means are provided to return the piston to its original position upon the completion of its travel. In an improved form of the invention, the cylinder cooperates with the braking system of the automobile to deliver hydraulic fluid to the braking system and initiate or supplement operation of the hydraulic control system for the brakes.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIGS. 4 through 7 are views in elevation of the piston and disk assembly during various stages of travel of the piston within its cylinder; and FIG. 8 is a cross-sectional view of a check valve assembly which can be used in conjunction with transmitting hydraulic fluid from the impact absorbing system to the braking system of the automobiles.

DESCRIPTION OF THE PREFERRED EMBODIMENTS

Figure 1:
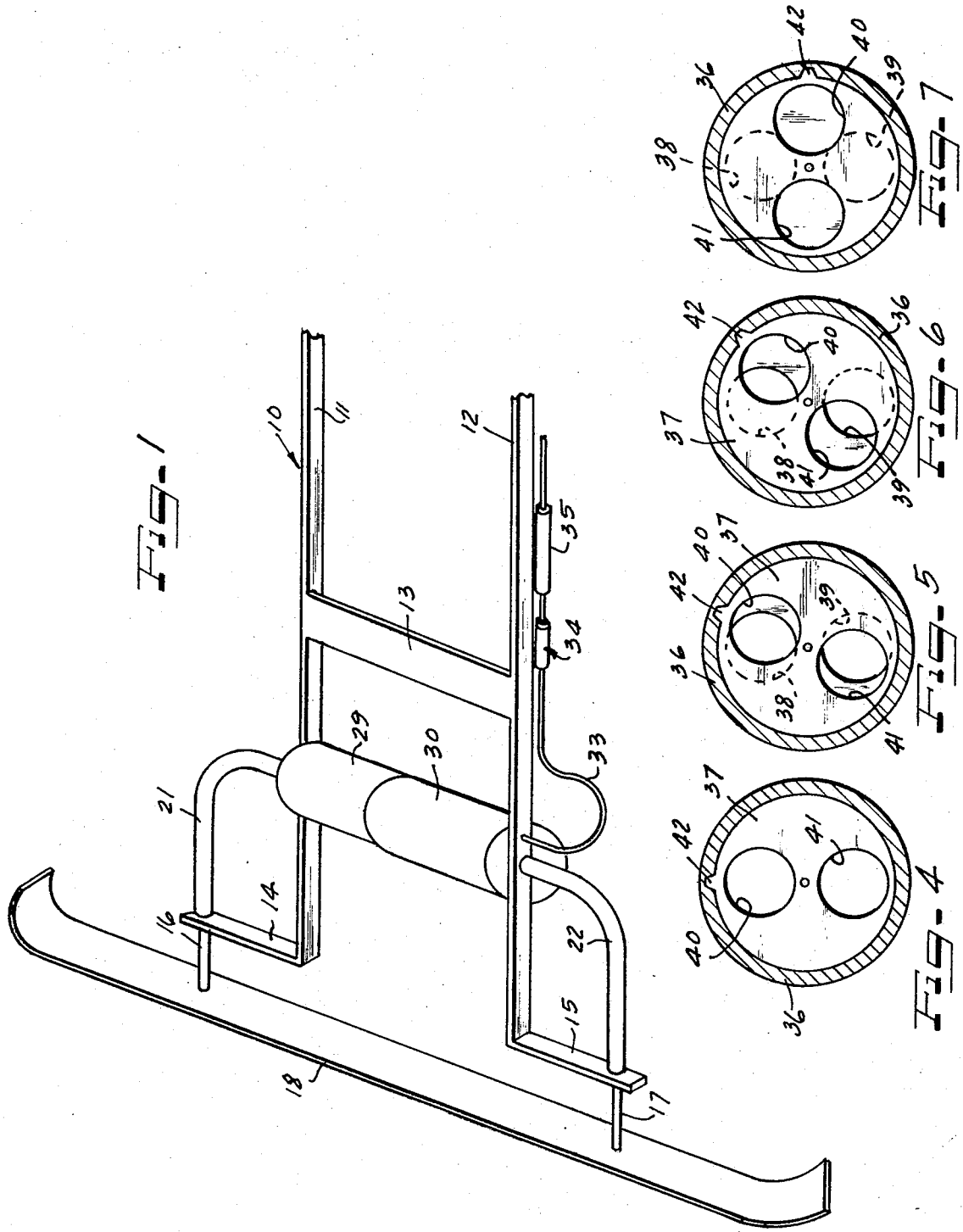
FIG. 1 is a somewhat schematic, fragmentary view of an automobile chassis incorporating the bumper assembly of the present invention and its control system.
Figure 2:
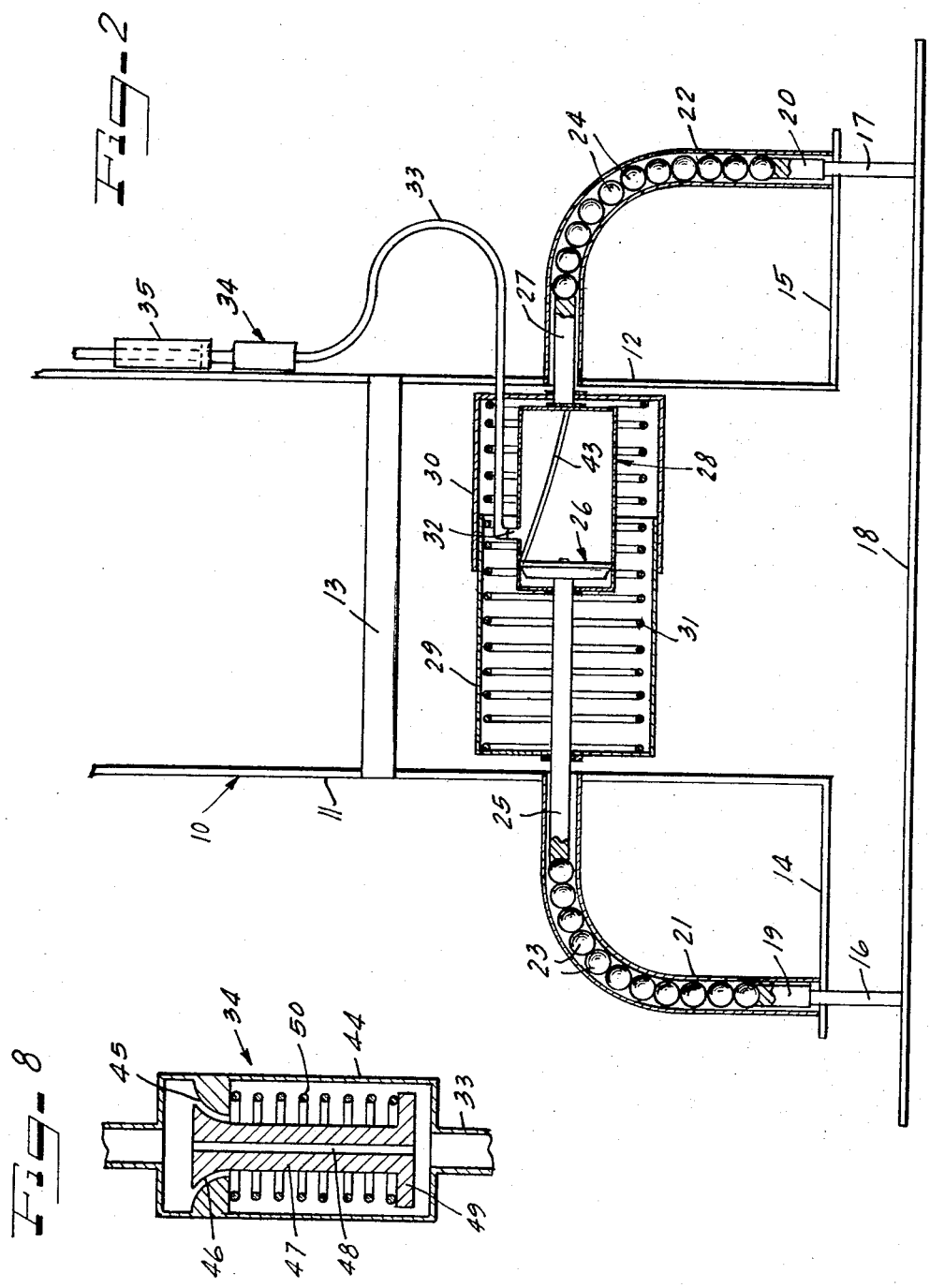
FIG. 2 is a view partly in elevation and partly in cross-section of the impact absorbing assembly under conditions of no impact.
Figure 3:
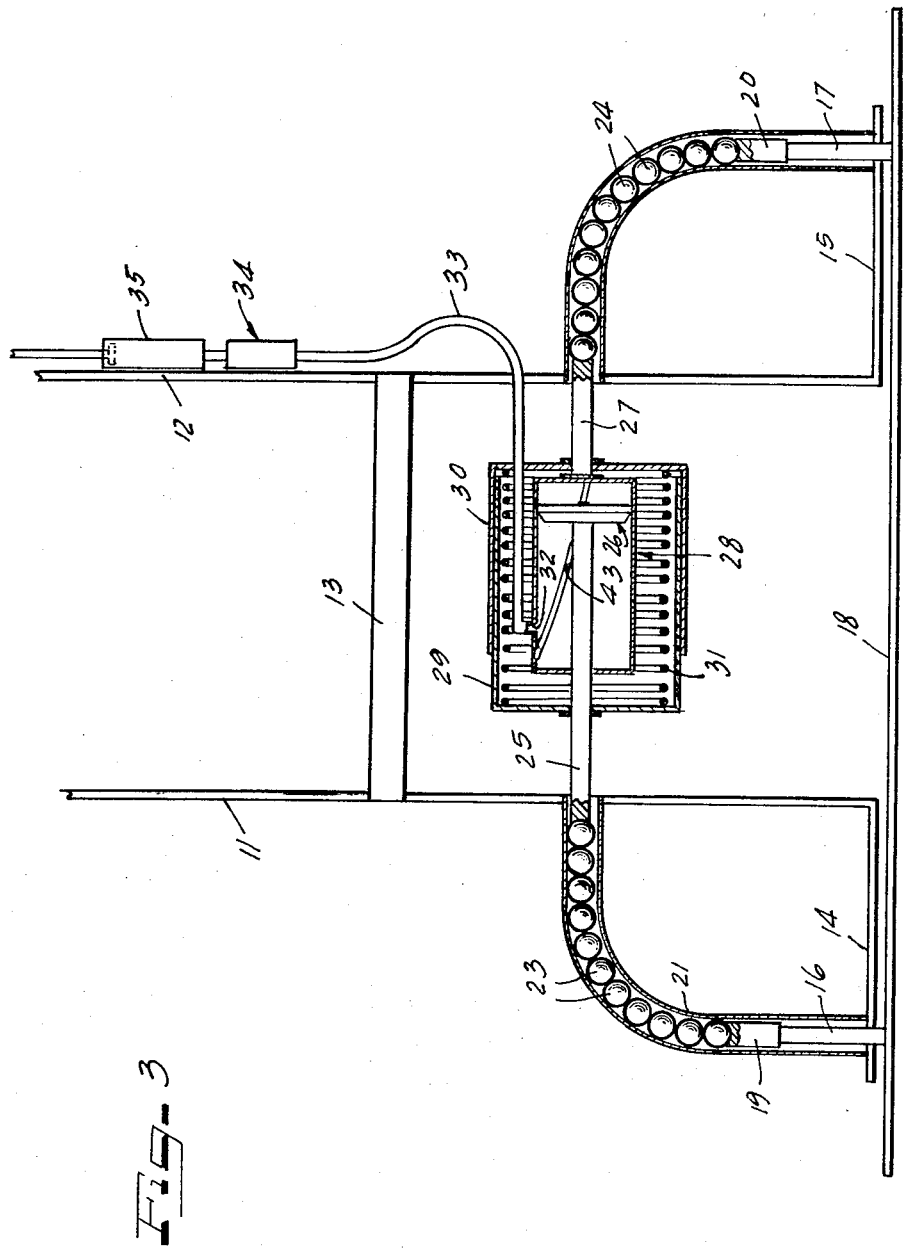
FIG. 3 is a view similar to FIG. 2 illustrating the condition of the assembly after substantial impact against the bumper.

In FIG. 1, reference numeral 10 indicates generally the chassis of an automobile which for purposes of simplicity has been shown to include a pair of side rails 11 and 12 and a plurality of cross braces 13. The ends of the side rails 11 and 12 are formed with laterally, outwardly extending flange portions 14 and 15. Passing through the flange portions 14 and 15, respectively, and in sliding relation thereto are a pair of rods 16 and 17 which are fixedly secured to a bumper 18. As best seen in FIGS. 2 and 3, the rods 16 and 17 are provided with headed end portions 19 and 20, respectively, which are arranged to be received within tubular conduits 21 and 22. One end of the conduit 21 is secured to the flange portion 14, and the opposite end is secured to the side rail 11. Similarly, one end of the conduit 22 is secured to the flange portion 15 and the opposite end is secured to the side rail 12. The dimensions of the conduits 21 and 22 need not be formed to accurate tolerances inasmuch as they merely serve to confine and align a plurality of rotating balls 23 and 24, respectively, in each of the conduits. The last in the series of balls 23 acts against a shaft 25 at the end of which there is secured a piston assembly generally indicated at numeral 26 in the drawings. Similarly, the last of the balls in the series of balls 24 acts against a shaft 27 which is secured to one end of a cylinder 28. The cylinder assembly is included within a telescoping cover composed of telescoping sections 29 and 30, respectively. Under normal, no load conditions, the telescoping sections 29 and 30 are held apart by the action of a biasing spring 31 as illustrated in FIG. 2 of the drawings.

A fluid exhaust port 32 is provided in the cylinder 28 and communicates by means of a flexible hose 33 to a check valve generally illustrated at numeral 34 of the drawings which in turn is connected to a cylinder 35 forming part of the automotive braking system. The cylinder 35 is in parallel with the brake pedal and, through its actuation, serves to apply a braking force to the automobile shortly after the piston 26 begins its travel within the cylinder 28 as will be apparent from the succeeding description.

The piston assembly 26 includes a piston 36 and a disk 37 mounted coaxially thereon for rotative movement relative thereto, as illustrated best in FIGS. 4 to 7 of the drawings. The piston 36 is provided with a pair of apertures 38 and 39, while the disk 37 is also provided with a pair of diametrically opposed apertures 40 and 41. When the disk 37 and the piston 36 are aligned with their apertures in registry, as illustrated in FIG. 4 of the drawings, fluid in the cylinder 28 meets with a minimum amount of resistance. This is a condition which exists at the initiation of travel of the piston assembly 26 within the cylinder 28. The disk 37 is provided with an angular projection 42 which rides in a groove 43 provided in the cylinder wall. Thus, as the piston assembly 26 is moved farther to the right, as seen in FIG. 2, the engagement of the projection 42 within the groove 43 causes the disk 37 to rotate clockwise relative to the piston 36 so that a greater restriction to fluid flow is provided upon such rotation. Intermediate positions of the disk relative to the piston are illustrated in FIGS. 5 and 6 of the drawings. Eventually, the resulting orifice provided between the apertures 38 and 39 of the piston, and apertures 40 and 41 of the disk will be so small as to cause virtually no flow of fluid to exist through the piston assembly. This condition is illustrated in FIG. 7 of the drawings.

A type of check valve 34 which can be used in the assembly is illustrated in FIG. 8 of the drawings. This particular valve includes a casing 44 in which there is a valve seating surface 45 arranged to seat an arcuate valve head 46 which is integral with a valve stem 47. Extending through the valve stem 47 and the valve head 46 is a small diameter axial passageway 48 which permits bleeding of fluid therethrough from the brake system even when the valve is closed. In FIG. 8, the valve is shown in its open position as an annular flange portion 49 at the base of the valve member is shown lifted from the base of the chamber 44 by the pressure of fluid entering through the conduit 33. A light spring 50 returns the valve element to its seated position when there is no pressurized fluid passing through the conduit 33.

The operation of the device should be evident from what has been said heretofore. When the bumper 18 is subjected to a considerable impact, the balls 23 and 24 transfer a substantial amount of the force involved to the shafts 25 and 27 by the rolling engagement which the balls have with each other. These oppositely directed forces cause the piston assembly 26 and the cylinder assembly 28 to move in opposite directions with respect to each other, against the bias provided by the spring 31, as illustrated in FIG. 3. Immediately upon reciprocatory movement of the piston 26, hydraulic fluid is forced into the conduit 33 under pressure to unseat the valve element in the check valve 34, and thereby direct pressurized fluid to the brake control system of the automobile to initiate application of brakes. Further movement of the piston assembly 26 within the cylinder 28 causes the disk 37 to rotate relative to the piston 36 and thereby provide successively greater resistance to fluid flow through the piston, because of the increasing misalignment between the apertures 40 and 41 in the disk with the apertures 38 and 39 in the piston. When the forces are dissipated in this manner, the spring 31 then returns the piston and cylinder assembly to the position shown in FIG. 2, and hydraulic fluid can bleed back through the check valve 34 into the cylinder 28.

In the system described, the high pressure of the fluid is confined between the piston and the closed end of the cylinder, so that no high pressure acts on the other portions of the moving elements, and therefore high pressure seals are not required for the shafts 25 and 27. It should also be noted that the assembly can be manufactured without the use of elements machined to close tolerances, so that it is inexpensive to manufacture and install.

I claim as my invention:

1. An impact absorbing bumper assembly comprising a bumper, a pair of spaced rods secured to said bumper, a cylinder arranged to be secured to the chassis of a vehicle, a piston arranged to reciprocate within said cylinder, a first shaft secured to one end of said cylinder, a second shaft secured to said piston extending from the opposite end of said cylinder, a pair of tubular members each having right angle bends therein receiving said rods, one of said tubular members receiving the free end of said first shaft and the other of said tubular members receiving the free end of said second shaft, and a plurality of discrete balls positioned in each of said tubular members between each of said rods and said free ends of said shafts to transmit impact forces from said bumper to said shafts.

2. The bumper assembly of claim 1 in which said piston includes a variable orifice means to reduce the amount of fluid passing through said piston as the displacement of the piston within the cylinder increases.

3. The bumper assembly of claim 1 which includes means for bleeding fluid from said cylinder to the vehicle braking system as the piston moves within said cylinder.

4. The bumper assembly of claim 2 in which said variable orifice means includes an aperture disk secured to said piston and rotatable relative thereto, said cylinder having guide means for causing such relative rotative movement during movement of said piston within said cylinder.

5. The bumper assembly of claim 3 which includes a check valve means between said cylinder and said braking system.

6. An impact absorbing bumper assembly comprising a bumper, a pair of spaced rods secured to said bumper, a cylinder arranged to be secured to the chassis of a vehicle, an apertured piston arranged to work on a liquid in reciprocating in said cylinder, variable orifice means on said piston arranged to provide a progressively greater flow resistance for liquid passing through said piston as the piston moves toward one end of said cylinder, a first shaft secured to one end of said cylinder, a second shaft secured to said piston extending from the opposite end of said cylinder, a pair of tubular members each having right angle bends therein receiving said rods, one of said tubular members receiving the free end of said first shaft and the other of said tubular members receiving the free end of said second shaft, and a plurality of discrete balls positioned in each of said tubular members between each of said rods and said free ends of said shafts to transmit impact forces from said bumper to said shafts.

7. The bumper assembly of claim 6 which includes conduit means arranged to communicate said cylinder to the braking system of said vehicle during a portion of the movement of said piston within said cylinder.

8. The bumper assembly of claim 6 in which said variable orifice means includes an apertured disk mounted to said piston and rotatable relative thereto, said cylinder being provided with guide means for effecting such relative rotating movement upon movement of said piston in said cylinder.

* * * * *